United States Patent Office 3,548,170
Patented Dec. 15, 1970

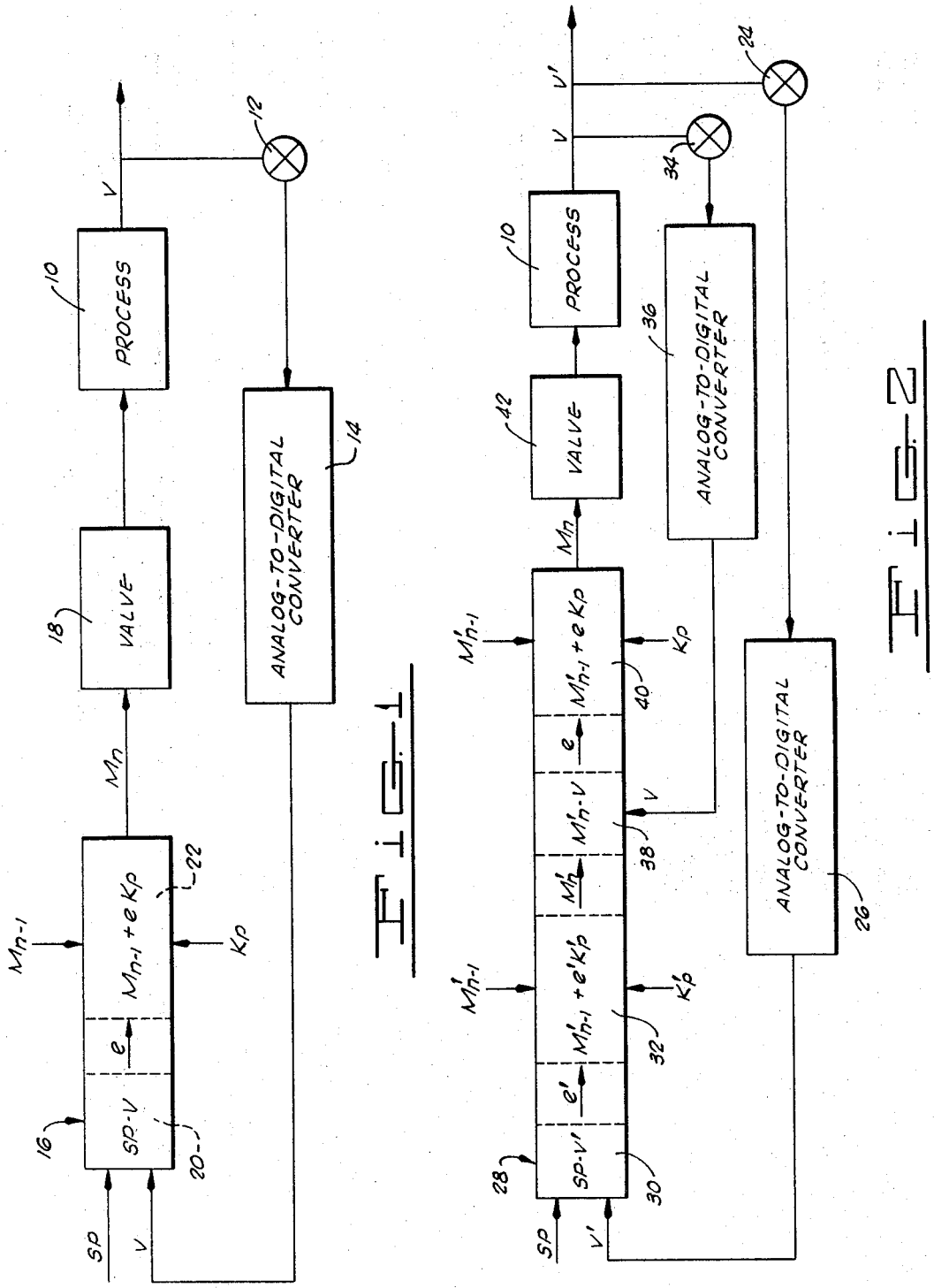

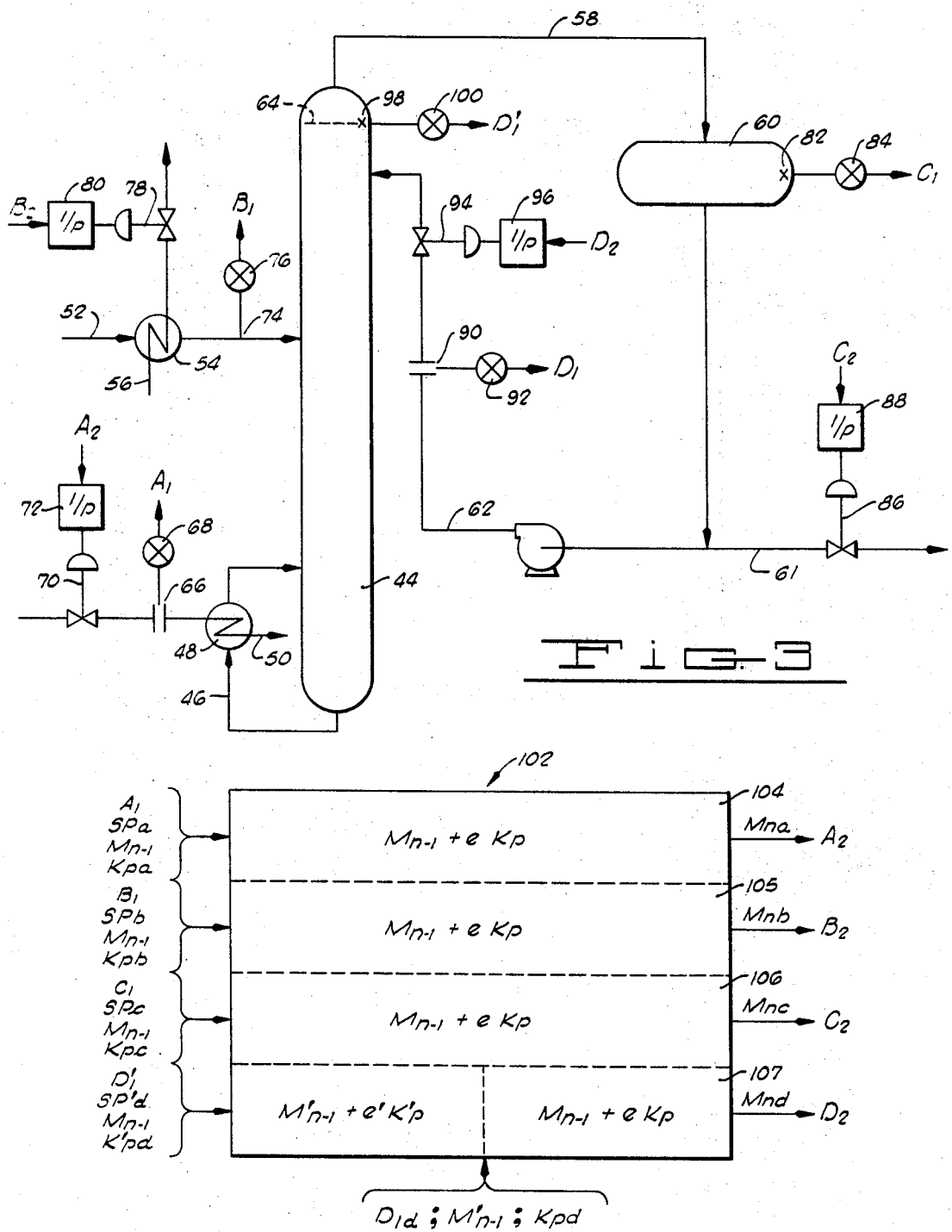

3,548,170
PROCESS CONTROL BY A DIGITAL COMPUTER
Ronald G. Bruce, Ponca City, Okla., and Robert J. Fanning, Baton Rouge, La., assignors to Continental Oil Company, Ponca City, Okla., a corporation of Delaware
Filed Nov. 9, 1964, Ser. No. 409,821
Int. Cl. G05b 15/00
U.S. Cl. 235—151.1                    1 Claim

ABSTRACT OF THE DISCLOSURE

A method for continuously controlling a process by incorporating sensing elements in the control lines and vessels so that a voltage will be developed by the sensing element which will correspond to the information being sampled by the sensing element and multiplex and digital means for examining periodically the voltage output from each sensing element and comparing this value to a set-point previously determined, and a computer for developing a control voltage which will change the position of some control apparatus which will tend to re-establish the process to its predetermined set-point. The above is accomplished by repositioning a valve or other element in accordance with the detected error.

---

This invention relates generally, as indicated, to the art of process control, such as the control of chemical or petroleum processes. More particularly, but not by way of limitation, the invention relates to an improved method and apparatus for controlling processes by a digital computer through direct valve actuation from the computer.

Conventional process control is based on control loops using analog signals of continuously varying pressure (for pneumatic systems) or voltage or amperage (for electronic systems) proportional to the values they represent. A loop starts with a sensing element (a thermocouple, for example) which senses a process variable and emits a signal proportional to the variable. This signal feeds to a controller, which compares it with a predetermined value of what it should be (set point) and sends an output signal (a control signal) to a final control element, such as a valve, which operates to keep the variable at set point. In controlling a process having a plurality of variables, such as 100 variables, a complete, separate, control loop, including a separate controller, is provided for each variable. Normally, the controllers are especially designed for the particular control function. It will thus be seen that the cost of process control using conventional techniques increases at substantially the same rate as the number of process variables to be controlled increases.

In accordance with the present invention, on the other hand, a single digital computer takes over direct control of all of the process variables to be controlled. That is, a single digital computer takes over the functions of all the analog controllers on a process. Signals from the sensing elements feed to an input multiplexer so that the computer can scan them one at a time. Before entering the computer, these signals are converted to digital signals having discrete values. Output signals (control signals) from the computer may be converted back to analog or remain digital. These control signals then go directly to the final control elements.

In the preferred form of the present invention, the algorithm solved by the computer for each of the process variables requires a single constant to greatly simplify the activities required in setting up the system. With this arrangement, the desired position of the control element which is easily determined on design considerations) is set in the computer and the person putting the system in operation only needs to vary the one constant input to the computer in order to obtain the desired control of the variable. Thus, the system is flexible for various control conditions, yet stability of a process variable may be obtained efficiently and in a short period of time. It should also be noted that the use of a single constant minimizes computer storage.

An object of this invention is to provide efficient control of one or more process variables.

Another object of this invention is to provide a highly flexible system for controlling process variables.

Another object of this invention is to provide direct digital control of process variables wherein the digital computer used in the system requires the use of a single constant in the functions performed by the computer for each process variable being controlled.

A further object of this invention is to provide a control system for process variables utilizing a single controller for multiple variables.

A still further object of this invention is to provide a control system for process variables which is economical, particularly when multiple process variables are to be controlled, and which provides precise control of the process variables.

Other objects and advantages of the invention will be evident from the following detailed description when read in conjunction with the accompanying drawings which illustrate the invention.

In the drawings:

FIG. 1 is an information flow diagram of a system constructed in accordance with this invention for controlling a single process variable.

FIG. 2 is another information flow diagram illustrating cascade control.

FIG. 3 is a flow chart of a distillation column showing application of the present system to control of the variables involved in operation of the distillation column.

FIG. 3A is a continuation of the control system of FIG. 3.

Figure 4:
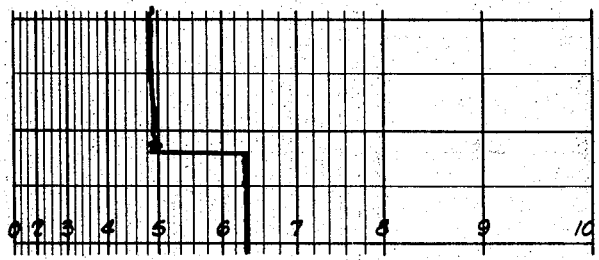
FIG. 4 is a recording of the control signal produced by a system incorporating the present invention upon a change in the set point for the control element associated with the control signal.

Referring to the drawings in detail, and particularly FIG. 1, reference character 10 designates a process having a variable V to be controlled. In accordance with the present invention, the variable V, which may be, for example, a temperature or a rate of flow, is continuously sampled by an appropriate measuring apparatus (not shown) such as a thermocouple or a pressure sensing device, and the continuous sample is fed to an electronic transmitter 12, such as an Electrik Tel-O-Set Δ P/I type transmitter manufactured by the Honeywell Company, of Philadelphia, Pa. The transmitter 12 in turn sends a continuous analog signal representing the value of the variable V to an analog-to-digital converter 14 for converting the analog representation to a digital representation. The digital representation or signal indicative of the actual value of the variable V is fed to one input of a digital computer 16 which scans the indicator signal at spaced intervals of time and procedures a control signal $M_n$. The control signal $M_n$ controls a suitable control element, such as a valve 18, which in turn controls the process 10 to adjust the process variable V to a predetermined set point value (SP) in the event the variable does not correspond to the set point value at the time of sampling of the variable by the computer 16. The computer 16 is suitably multiplexed, as is well known in the computer art, to sample the variable V at predetermined intervals of time.

The computer 16 may be of any suitable type, such as an RW–300 digital computer manufactured by the Bunker-Ramo Corporation of Canoga Park, Calif., which will solve the algorithm:

$$M_n = (M_{n-1}) + eK_p \qquad (1)$$

wherein:

$M_n$ = The control signal
$M_{n-1}$ = the immediately preceding control signal produced by the computer.
$e$ = the set point value (SP) minus the value of the variable at the time of the calculation (V).
$K_p$ = a constant.

In solving the foregoing algorithm, the computer 16 may be considered as having a difference section 20 to calculate $e$ by substracting the value of the variable at the time of sampling from the set point value; and a section 22 for performing the multiplication of $eK_p$ and the addition of the product thereof to the value of the preceding control signal $M_{n-1}$. The set point value SP is normally set in the computer and remains constant for a specific control operation. The preceding control signal $M_{n-1}$ is normally stored in the computer for use in the subsequent calculation in the manner discussed above. The constant $K_p$ is normally set in the computer at a value to produce the desired control signal $M_n$. As a practical matter, the constant $K_p$ is determined experimentally during the initial portion of a control operation and set at a value which will retain the variable V at the desired set point SP.

In use of the system illustrated in FIG. 1, the single process variable V being controlled is continuously sampled and represented as a digital signal at the input of the computer 16. The operation of the computer 16 is such to sample the digital value of the variable V at predetermined intervals of time, such as every four to eight seconds. Each time the computer samples the variable V, the computer immediately performs the aforementioned calculations to produce a new control signal $M_n$. The time required for the calculations by the computer 16 is measured in milliseconds. The value of the control signal $M_n$ remains constant for operation of the control element 18 until a new control signal value is produced by a subsequent operation of the computer 16. For a fairly uniform fluctuation of the variable V and for a given sampling rate, the constant $K_p$ will remain the same and will not need to be changed. However, in the event the operation of the process changes to vary the preceding type of variation of the variable V, or if it is desired to provide a faster sampling rate, the constant $K_p$ is adjusted accordingly to again maintain the variable V at the set point value. The system is therefore highly flexible and the response of the system is adequate to maintain precise control of the process variable V.

As an extension of the method previously described, the computer 16 may be programmed to compute the following algorithm:

$$M_n = (M_{n-1}) + K_1(SP-V)_n - K_2(SP-V)_{n-1} \qquad (2)$$

wherein:

$M_n$ = The control signal
$M_{n-1}$ = The immediately preceding control signal
SP = Set point value
V = Value of process variable
$n$ = Present value
$n-1$ = Immediately preceding value
$K_1$ = A constant
$K_2$ = A constant As will be appreciated by those skilled in the computer art, algorithm (2) provides a refinement in calculation of the control signal based on the previous differences between the values of the set point and the process variable which will be desirable in some control problems, such as when the process variable varies at an extremely low rate from the desired set point value.

The method and system described above in connection with FIG. 1 may also be utilized in a cascade arrangement to control two related process variables. As shown in FIG. 2, a process 10 may have two related variables V and $V^1$. For example, $V^1$ may be a temperature variable and V may be a flow rate variable. In accordance with the present invention, one of the variables, such as the temperature variable $V^1$, is continuously sampled and fed to an electronic transmitter 24 which feeds the indicator signal in the form of an analog representation to an analog-to-digital converter 26. The digital output of the converter 26 is in turn fed to one input of the digital computer 28. The computer 28 may also be an RW–300 computer and may be visualized as divided in several sections as indicated by the dashed lines in FIG. 2. In the first section 30, the computer 28 subtracts the value of the variable $V^1$ at a particular sampling time from a desired set point value (SP) to produce an error signal $e^1$. A second section 32 of the computer 28 produces an intermediate control signal $M^1{}_n$ by multiplying the error signal $e^1$ times $K^1{}_p$ (a constant) and adding the products of the multiplication to the immediately preceding intermediate control signal $M'_{n-1}$. As in the computer previously described, the constant $K'_p$ is normally set in the controller and the immediately preceding intermediate control signal $M'_{n-1}$ is stored in the computer from the preceding calculation.

The process variable V is continuously sampled and fed to another electronic transmitter 34 which in turn feeds an indicator signal in the form of a continuous analog representation to another analog-to-digital converter 36. The output of the converter 36 is a digital representation of the variable V and is frequently referred to herein as an indicator signal. This indicator signal is fed to another section 38 of the computer 28 along with the intermediate control signal $M'_n$ to calculate another error signal $e$. Still another section 40 of the computer 28 produces a control signal $M_n$ by multiplying the error signal $e$ by a constant $K_p$ and adding the products of the multiplication to the immediately preceding control signal $M_{n-1}$. Here again, the constant $K_p$ is normally set in the computer and the preceding control signal $M_{n-1}$ is normally stored in the computer from the preceding calculation. The final control signal $M_n$ is fed to a control element, such as a valve 42, to control the process 10 in accordance with the existing values of both of the variable V and V'.

To prove the present invention for controlling multiple process variables, the system has been used on a distillation column 44 as schematically illustrated in FIGS. 3 and 3A. The distillation column 44, which was used as an alcohol distillation tower, has a recycling line 46 passing through a reboiler 48. The heat exchange in the reboiler 48 is controlled by a hot oil line 50. The feed line 52 of the column was passed through a heat exchanger 54 to control the temperature of the feedstock. The operation of the heat exchanger 54 was in turn controlled by a hot oil line 56. The reflux line 58 of the tower was connected through an accumulator 60. The output of the accumulator 60 is connected through a line 61 to another portion of the alcohol distillation process, or through a continuation 62 of the reflux line leading back into the tower 44. Also, a tray 64 in the tower was used as a sampling point as will be hereinafter described.

The process variable associated with the recycling line 46 to be controlled was the rate of flow or hot oil through the line 50 and thence through the heater exchanger 48 for controlling the temperature of the recycling stock. This process variable was sensed by an orifice flow measurement device 66 energizing and electronic transmitter 68, such as a ΔP/I electronic transmitter manufactured by the Honeywell Company, of Philadelphia, Pa. Control of the rate of flow of the oil through the hot oil line 50 was made by a pressure responsive control valve 70 receiving signals from a I/P transducer 72 manufactured by the Fisher Governor Company of Marshalltown, Iowa. The interaction between the transmitter 68 and the I/P transducer 72 will be described below.

The process variable in connection with the feed line 52 was the temperature of the feedstock which was sensed by a suitable thermocouple 74 energizing another electronic transmitter 76. The temperature of the feedstock was in turn controlled by means of the pressure responsive valve 76 energized by another I/P transducer 80. It will be apparent that the rate of flow of the hot oil through the hot oil line 56 controls the temperature of the feedstock flowing through the inlet line 52.

The level of the reflux liquid in the accumulator 60 was sensed by a liquid level float 82 energizing another electronic transmitter 84. The level of liquid in the accumulator 60 was controlled by another pressure responsive valve 86 interposed in the flow line 61 operating in response to signals from another I/P transducer 88. The innerconnection and interrelation between the transmitter 84 and the transducer 88 will be set forth below.

The amount of flow of reflux material through the line 62 back into the tower 44 was sensed by an orifice flow measurement device 90 energizing another electronic transmitter 92. The flow through the reflux line 62 was controlled by another pressure responsive control valve 94 in response to signals received from another I/P transducer 96.

The temperature of the material at tray 64 in the tower 44 was sensed by a thermocouple 98 energizing another electronic transmitter 100, and the output of the transmitter 100 was utilized with the output of the transmitter 92 in setting the control valve 94 as will be set forth below.

To complete the control system for the process variables of the distillation tower as illustrated in FIG. 3, we utilized a digital computer 102 as shown in FIG. 3A. The computer 102 was a type RW-300 manufactured by the Bunker-Ramo Corporation of Canoga Park, Calif. In use of the computer 102, we utilized what may be considered four channels 104, 105, 106 and 107, as illustrated by the dashed lines in FIG. 3A. It will be understood that we are considering the computer 102 to have four channels merely for the purpose of facilitating the description of the complete system. In the actual computer, the various variable inputs are multiplexed and the computer makes the various sequential computations through use of the same components.

The output of the transmitter 68 (designated $A_1$ in the drawings) was fed to the input of the channel 104 of the computer 102 (through a suitable analog-to-digital computer in the manner previously explained), along with the desired set point value for the associated control valve 70 and the necessary constant $K_{pa}$ as set forth above. The channel 104 produced the desired control signal $M_{na}$ at the output $A_2$ as shown in FIG. 3A in accordance with the algorithm (1) explained in detail above. The control signal $M_{na}$ associated with the output $A_2$ was in turn transmitted to the respective transducer 72 for controlling operation of the associated control valve 70 and maintaining the rate of flow through the hot oil line 50 in accordance with the desired rate of flow.

The analog indicator signal produced by the transmitter 76, indicated as $B_1$ on the drawing, was transmitted from the transmitter 76 to the input of channel 105 of the computer 102 through a suitable analog-to-digital converter (not shown) as previously indicated in connection with the process illustrated in FIG. 1. The channel 105 of the computer 102 also received the appropriate set point value and the appropriate constant $K_{pb}$ in order that the channel performed the calculation in accordance with algorithm (1) as set forth above. The control signal $M_{nb}$ produced by the channel 104 at the output $B_2$ of the channel 105 was transmitted to the associated transducer 80 for operating the associated control valve 78.

The indicator signal representing the liquid level in the accumulator 60 and produced by the liquid level float 82 and transmitter 84 (designated $C_1$ on the drawings) was transmitted through a suitable analog-to-digital converter to the input of channel 106 of the computer 102 along with the appropriate set point value and constant $K_{pc}$ for producing the appropriate control signal $M_{nc}$. As will be observed on the drawings, the output $C_2$ of the channel 106 is directed to the associated transducer 88 to control operation of the valve 86 which in turn controls the level of liquid in the accumulator 60.

The temperature at the tray 64 in the tower 44 sensed by the thermocouple 98 and the transmitter 100 was transmitted as indicated by $D'_1$ to the input of the channel 107 of the computer 102 (along with the appropriate set point $SP'_d$ and constant $K'_{pd}$ for performing the first algorithmic operation in the manner set forth above in connection with FIG. 2. The rate of flow variable sensed by the orifice meter sensing device 90 and the associated transmitters 92 was also transmitted to the channel 107 of the computer 102 to provide a cascading type computing function as described above in detail in connection with FIG. 2. The resulting control signal $M_{nd}$ at the output $D_2$ of the section 107 was transmitted back to the associated transducer 96 for operating the valve 94 and controlling the amount of reflux material refluxed to the tower 44.

In the installation illustrated in FIGS. 3 and 3A, each transmitter 68, 76, 84, 92 and 100 produced indicator signals which were each individually converted to digital values before being fed to the computer 102. The computer 102 was multiplexed to sequentially scan the respective indicator signals and produce the four control signals $M_n$. As in the previous discussions of the present system, each control signal remained constant until the respective channel of the computer 102 received a new indicator signal giving rise to a change in the respective control signal. The scan rate of the computer 102 was varied from four to eight seconds, which resulted in a sampling of each control variable at least once each eight to four seconds with a resulting change in the respective associated control valve in the event of a change in the respective process variable.

As an illustration of the effectiveness of the control system illustrated in FIGS. 3 and 3A, FIG. 4 is a reproduction of the control signal $M_{nb}$ appearing at the output $D_2$ of the computer 102. At the beginning of the portion of the signal illustrated (which is shown at the bottom of the figure) the control signal was staying steady at a value of 6.4 corresponding to the associated set point value. To test the system, the set point value was changed from 6.4 to 4.9. As will be observed in FIG. 4, the control signal immediately responded to a change in the set point value and produced a corresponding control signal of 4.9. The small variations in the curve at the beginning of the 4.9 level shows a slight overshoot and undershoot of the set point value that was not of sufficient magnitude to upset the end results.

Figure 5:
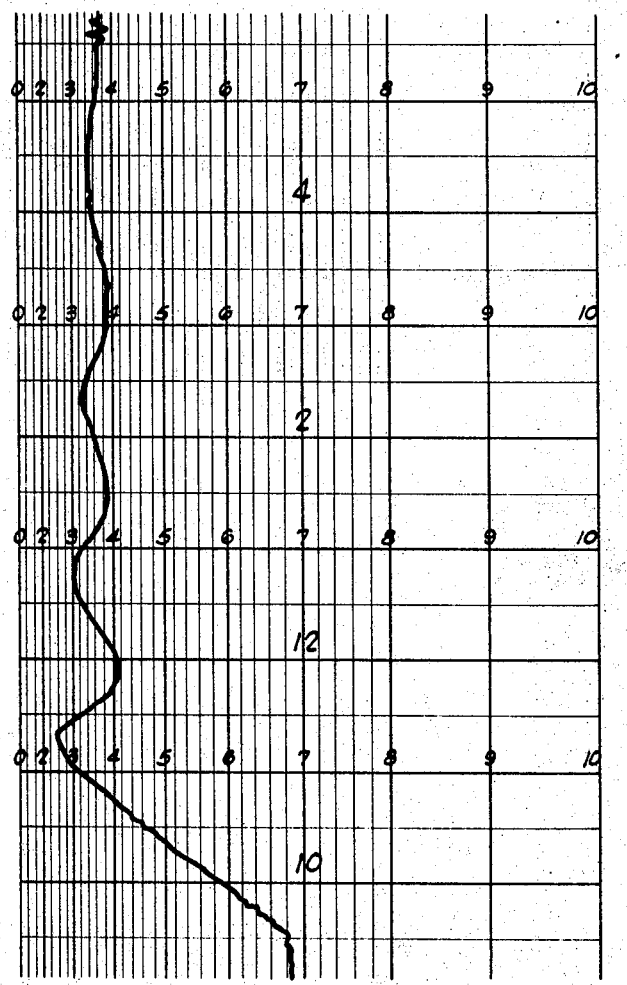
FIG. 5 is a recording of a control signal showing the change in the control signal upon cascading two process variables.

To further illustrate the use of the system shown in FIGS. 3 and 3A, FIG. 5 is a representation of the rate of flow as measured by the orifice device 90 when the temperature samples at tray 64 of tower 44 were digitally cascaded onto the rate of flow variable sensed by the sensor 90. Here again, the curve starts at the bottom of the figure. It will be observed that when the temperature indicator signals were cascaded digitally onto the rate of flow indicator signals and handled in the channel 107 of the computer 102, the flow decreased rather slowly to a new, lower level which corresponded to the required temperature for the desired alcohol purity produced by the distillation tower 44. It will also be noted that there were slow variations in the flow in FIG. 5 on both sides of the lower level for a period of time, but the magnitude of the flow soon leveled off at a relatively constant value in accordance with the new process variable under control.

From the foregoing it will be apparent that the present invention provides an efficient control of one or more process variables. The number of process variables which can be controlled is limited only by the number of inputs which the respective digital computer can scan and accomodate in the calculation section of the computer. The larger number of process variables being controlled, the more economical will be the complete system per process variable. It will also be apparent that the present system provides a flexible system for controlling process variables and that the process variables can be controlled to a high degree of precision to provide the utmost in economy of the process being controlled.

Changes may be made in the combination and arrangement of parts or elements as well as in the steps and procedures heretofore set forth in the specification and shown in the drawings without departing from the spirit and scope of the invention as defined in the following claim.

We claim:
1. A method of controlling a process having a variable, comprising:
   producing a set point signal related to the desired value of the process variable;
   producing a series of indicator signals at spaced intervals of time related to the actual values of the process variable at the time of production of the respective indicator signals;
   producing an error signal at the end of each of said intervals which is related to the difference between the set point signal and the respective indicator signal;
   producing a control signal substantially at the end of each of said intervals, each of said control signals being directly proportional to the value of the preceding control signal and the error signal produced at substantially the same time as the respective control signal and wherein each control signal comprises the sum of the immediately preceding control signal and the product of the respective error signal and a constant, minus the product of the immediately preceding error signal and a second constant;
   controlling the process with each of said control signals from the time of production of the respective control signal until the production of the next subsequent control signal; and
   storing said control signal to provide said preceding control signal for a subsequent process control.

References Cited

UNITED STATES PATENTS

| | | | |
|---|---|---|---|
| 3,201,572 | 8/1965 | Yetter | 235—151 |
| 3,391,275 | 7/1968 | Bullock et al. | 235—151.1 |

OTHER REFERENCES

Eckman "Automatic Process Control," John Wiley & Sons, Inc., TJ 213, E 25, pp. 59–69.

EUGENE G. BOTZ, Primary Examiner